(12) United States Patent
Yang et al.

(10) Patent No.: US 10,261,209 B2
(45) Date of Patent: Apr. 16, 2019

(54) NEAR-BIT ULTRADEEP MEASUREMENT SYSTEM FOR GEOSTEERING AND FORMATION EVALUATION

(71) Applicants: China Petroleum & Chemical Corporation, Beijing (CN); Sinopec Tech Houston, LLC., Houston, TX (US); Drilling Technology Research Institute of Shengli Petroleum Engineering Corporation Limited, Sinopec, Dongying, Shandong (CN)

(72) Inventors: Jinzhou Yang, Shandong (CN); Sheng Zhan, Houston, TX (US); Zhen Yang, Shandong (CN); Jinhai Zhao, Houston, TX (US); Hongbing Xiao, Shandong (CN); Weiping Xu, Houston, TX (US); Haihua Zhang, Shandong (CN); Herong Zheng, Houston, TX (US)

(73) Assignees: CHINA PETROLEUM & CHEMICAL CORPORATION, Beijing (CN); SINOPEC TECH HOUSTON, LLC, Houston, TX (US); DRILLING TECHNOLOGY RESEARCH INSTITUTE OF SHENGLI PETROLEUM ENGINEERING CORPORATION LIMITED, SINOPEC, Dongying, Shandong (CN)

( * ) Notice: Subject to any disclaimer, the term of this patent is extended or adjusted under 35 U.S.C. 154(b) by 491 days.

(21) Appl. No.: 15/056,307

(22) Filed: Feb. 29, 2016

(65) Prior Publication Data

US 2017/0248013 A1 Aug. 31, 2017

(51) Int. Cl.
*E21B 7/06* (2006.01)
*G01V 3/26* (2006.01)
(Continued)

(52) U.S. Cl.
CPC .............. *G01V 3/26* (2013.01); *E21B 7/068* (2013.01); *E21B 47/02216* (2013.01);
(Continued)

(58) Field of Classification Search
CPC . E21B 49/003; E21B 4/00; E21B 7/04; E21B 41/0085; E21B 7/068;
(Continued)

(56) References Cited

PUBLICATIONS

Aaron J. Wheeler et. al., The Introduction of an At-Bit Natural Gamma Ray Imaging Tool Reduces Risk Associated with Real-Time Geosteering Decisions in Coalbed Methane Horizontal Wells, SPWLA 53rd Annual Logging Symposium held Cartagena, Colombia, Jun. 16-20, 2012, pp. 1-12 (Year: 2012).*

(Continued)

*Primary Examiner* — Rehana Perveen
*Assistant Examiner* — Justin C Mikowski
(74) *Attorney, Agent, or Firm* — Novick, Kim & Lee, PLLC; Allen Xue

(57) ABSTRACT

A downhole drilling tool that has a deep-reading logging tool, a near-bit resistivity tool, and a gamma ray detector. Formation information logged using the deep-reading logging tool is used to build a preliminary stratigraphic model with a relatively low resolution. The preliminary stratigraphic model is further refined using data logged using the near-bit resistivity tool and/or the gamma ray detector to obtain a refined stratigraphic model with a higher resolution. The model is used to guide geosteering to achieve better well placement and trajectory control.

9 Claims, 10 Drawing Sheets

(51) Int. Cl.
  *G01V 3/30* (2006.01)
  *G01V 5/12* (2006.01)
  *E21B 47/12* (2012.01)
  *E21B 47/022* (2012.01)

(52) U.S. Cl.
  CPC .............. *E21B 47/122* (2013.01); *G01V 3/30* (2013.01); *G01V 5/125* (2013.01)

(58) Field of Classification Search
  CPC ... E21B 47/02216; E21B 47/122; G01V 3/26; G01V 5/125; G01V 3/30
  USPC .......................................................... 703/10
  See application file for complete search history.

(56) References Cited

PUBLICATIONS

PayZone Steering, Schlumberger, 2013; (Year: 2013).*
PetroWiki—Electrode resistivity devices, Captured Jul. 8, 2018, last modified Jun. 24, 2015, 8 pages, petrowiki.org/Electrode_resistivity_devices (Year: 2015).*
Tom Barber, et. al., Real-Time Openhole Evaluation, Oilfield Review, pp. 36-57, Summer 1999 (Year: 1999).*
AWR, Schlumberger, 2013 (Year: 2013).*
iPZIG 475, Schlumberger, 2013 (Year: 2013).*
iPZIG 800, Schlumberger, 2013 (Year: 2013).*
iPZIG At-Bit Inclination, Gamma Ray, and Imaging Service, Schlumberger, describing iPZIG 475 and iPZIG 800. (Year: 2013).*
Richard A. Rosthal, et. al., Near-bit resistivity tool calculates dip real time, Oil & Gas Journal, Apr. 6, 1998, pp. 1-8 (Year: 1998).*
Survivor iPZIG, Schlumberger, 2015, pp. 1-2. (Year: 2015).*

* cited by examiner

NEAR-BIT ULTRADEEP MEASUREMENT SYSTEM FOR GEOSTEERING AND FORMATION EVALUATION

TECHNICAL FIELD

The present disclosure relates generally to oil and gas exploration, particularly to methods and systems for formation evaluation and directional drilling.

BACKGROUND

Logging-While-Drilling (LWD) is widely used in oil and gas drilling and formation evaluation. LWD collects information such as formation resistivity, gamma ray, neutron porosity, borehole caliper, well inclination during the drilling process and transmits the real-time information to the surface, which can be used to guide geosteering.

LWD has been continuously improving in the past decades so that its accuracy and reliability are comparable to those of wireline logging. For example, in the earlier days, electromagnetic resistivity measurement tools operated at 2 MHz. The formation resistivity was combined with natural gamma ray readings to detect distinct changes in the formation and to locate the pay zone so that the drilling tool could be steered to maximize its trajectory inside the pay zone. However, the formation being measured can often be more than ten meters above the drill bit using conventional logging tools, which renders it inadequate for real-time geosteering.

More recently, deep-reading electromagnetic measurement tools become available, which can detect formation information more than 5 meters into the formation. This enables the determination of formation boundary further down so that the drilling tool could be guided to avoid the oil/water reservoir boundary or cap rocks.

Consequently, there is a need for drilling systems and methods that utilize a combination of measurement tools in order to more accurately measure the formation information and guide geosteering.

SUMMARY

In one aspect, the current disclosure provides a downhole drilling system for directional drilling. The downhole drilling system has a downhole motor that is configured to rotate a drill bit. The downhole drilling system also includes a first array of antennas, including at least one transmitter and at least two receivers disposed above the downhole motor away from the drill bit. The downhole drilling system further includes a second array of antennas, including at least one transmitter and at least two receivers, disposed between the downhole motor and the drill bit.

A transmitter in the first antenna array is placed more than 10 meters away from one of the receivers. This transmitter is configured to transmit electromagnetic signals at one of at least four frequencies in the range of 1 kHz and 200 kHz. A transmitter in the second antenna array is configured to transmit electromagnetic signals at one of at least two frequencies in the range of 0.2 MHz to 4 MHz.

In one embodiment, the first antenna array is a deep-ready logging tool and the second antenna array is a near-bit resistivity tool. Both can be used to obtain azimuth resistivity of the formation as the drill bit traverses the formation. The downhole drilling system also has a gamma ray detector that reads azimuth gamma ray radiations.

In another aspect, this disclosure provides a method for determining the properties of a formation traversed by a drilling tool. This method employs a drilling tool that comprises a near-bit resistivity tool, a deep-reading electromagnetic logging tool, and a drill bit. The distance between the near-bit resistivity tool and the drill bit is smaller than the distance between the deep-reading electromagnetic logging tool and the drill bit. This method further employs a preliminary stratigraphic model built based on available geological data (e.g., from neighboring wells, pilot wells, etc.). This preliminary model is applied to the deep-reading logging tool to obtain a simulation response. In the meantime, the deep-reading logging tool measures responses from the formation while it is deployed downhole. Iterative forward modeling is performed to adjust the preliminary stratigraphic model is performed until the simulation response substantially matches the response logged by the deep-reading electromagnetic logging tool.

Afterward, the adjusted preliminary stratigraphic model is used as a starting point to build a refined model. Likewise, the refined model is applied to the near-bit resistivity tool to obtain a simulation response and the near-bit resistivity tool also logs responses from the formation while drilling. Iterative forward modeling is performed to further adjust the refined model until the simulation response substantially matches the responses logged by the near-bit resistivity tool.

In this method, the gamma ray detector is deployed together with the near-bit resistivity tool to evaluate formation property close to the drill bit.

More accurate formation information can be used to guide geosteering, achieving better well placement and trajectory control.

BRIEF DESCRIPTION OF THE DRAWINGS

The teachings of the present invention can be readily understood by considering the following detailed description in conjunction with the accompanying drawings.

DETAILED DESCRIPTION

Figure 1:
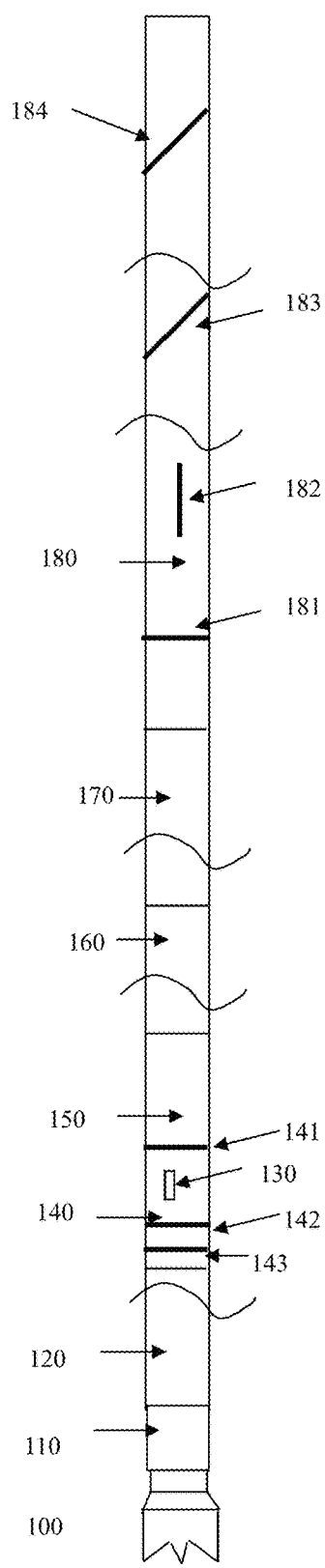
FIG. 1 is a schematic diagram showing one embodiment of the drilling system.

Reference will now be made in detail to the embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the present disclosure.

FIG. 1 is a schematic diagram of a drilling tool of the current disclosure. The drilling tool includes a near-bit resistivity tool 140 for measuring formation information near the bit, e.g., about 4 ft into the wall of the borehole. The near-bit resistivity tool 140 in this embodiment comprises an array of coil antennas including a transmitter of electromagnetic signals 141 and two receivers of electromagnetic signals 142 and 143, installed on a drill collar (not specifically shown, part of the drill string). In this particular embodiment, the transmitter 141 and the receivers 142 are all coaxial with the drill collar so that their magnetic moments are aligned along the axis of the drill collar; hereinafter referred to as "axial transmitter" or "axial receiver." Alternatively, one or more among 141, 142, and 143 can be arranged so that they are not coaxial with the drill collar, e.g., titled or transverse. The near-bit resistivity tool 140 is installed below the downhole motor 150 (or a rotatory steerable mechanism, not shown). An azimuthal gamma ray detector 130 is installed on the same drill collar between the transmitter 141 and the receiver 142. The gamma ray detector detects natural gamma rays near the drill bit directionally as the drilling tool rotates. The azimuthal gamma ray readings can be used to construct gamma ray images.

A wellbore inclination measurement unit 160 is installed above the downhole motor 150. It measures wellbore inclination and the toolface. The communication and power supply unit 170 powers the measurement tools in the system. It also relays data from the downhole measurement tools to the surface, and vice versa. Unit 170 can be powered by a battery pack installed therein or powered by a mud turbine (not shown) in the downhole motor 150.

An azimuth deep-reading electromagnetic logging tool 180 is provided above the unit 170. In the embodiment of FIG. 1, the logging tool 180 also has an array of antennas, namely an axial transmitter 181, a transverse receiver 182, and two tilted receivers 183 and 184. This array of antennas can be installed on one drill collar or more than one drill collars coaxially coupled together. The spacing between the antennas can be adjusted as needed. Other measurement tools can be installed between the transmitter and the receivers. Data from the near-bit resistivity tool 140 and the gamma ray detector 130 can be relayed to the deep-reading electromagnetic logging tool 180 by hard-wiring or via wireless communications between the transmitter 141 and receivers 182, 183, and/or 184.

Furthermore, the drilling tool of FIG. 1 has a drill box 110 that houses a drill bit 100. The downhole motor 150 is connected to a driver shaft assembly (not shown) that extends through the drill collar hosting the near-bit resistivity tool 140, the bend housing 120, the bit box 110, and is connected to the drill bit 100. As such, the downhole motor 150 rotates the drill bit 100 to accomplish directional drilling.

Figure 2:
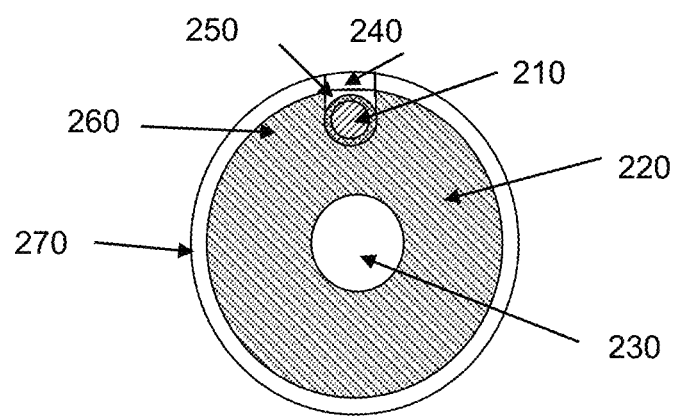
FIG. 2 is a cross-sectional view showing one embodiment of the gamma ray detector.

In this embodiment, the gamma ray detector 130 provides data to study lithology and to estimate shale volume and grain size. The gamma ray log is also used to adjust wellbore trajectory in drilling high-angle and horizontal well trajectories. FIG. 2 shows an embodiment of an azimuth gamma ray detector of the current disclosures. The gamma ray detector has a NaI scintillator 250 and is installed in a recess on the drill collar 220. The drill collar 220 is mostly covered by a housing 270 and has tubular conduit in its center 270 for passing the drilling fluid. A rubber tubing 260 insulates the scintillator 250 from the drill collar 220. An epoxy resin is used to fill the opening 250 up to the inner boundary of the housing 270. The opening in the housing 270 is filled with beryllium copper. The housing 270 is made of lead or tungsten to shield radiation from reaching the scintillator 250. The majority of gamma rays received by the scintillator 250 are through the opening 250. Accordingly, the gamma ray detector of FIG. 2 provides directional readings of gamma rays as the drilling tool rotates through the formation.

The gamma ray detector may employ more than one gamma ray probe, e.g., scintillators such as 250. Likewise, each probe would be aligned with an opening such as 250 so as to allow the gamma ray radiations to reach that probe.

In a further embodiment, the wellbore wall is divided into twelve sectors for signal collection and processing, i.e., data collecting sectors. Assuming the angular velocity of the drill bit is ω, the penetration speed is v, the time T for each rotation is $$T = \frac{2\pi}{\omega}.$$

When the drilling string starts at initial time to, the initial position of the opening in the gamma ray detector (hereinafter "the gamma ray detector") is at $\theta_o$. When the drill string stops at $t_s$, the gamma ray detector is at position θ.

$$\theta = \frac{t - t_s - t_0}{T} \cdot 2\pi = (t - t_s - t_0) \cdot \omega \qquad (1)$$

After subtracting 2nπ (n being the number of the rotation) from θ, the result is the angle of the gamma ray detector at time t. Furthermore, this angle also places the gamma ray detector in one sector among the twelve sectors along the wellbore wall.

Assuming the time interval between two readings of gamma ray is L, the number of rotation R within the time interval L is:

$$R = \frac{L/V}{2\pi/\omega} = \frac{L\omega}{2\pi v} \qquad (2)$$

In another embodiment, three gamma ray probes are disposed 120° apart about the circumference of the drill collar. The gamma ray collecting sectors are determined relative to the toolface so that they are fixed.

On the other hand, each gamma ray probe corresponds to its own counting sectors. Counting starts at the counting sector 1 when the measurement begins. As a result, the data collecting sector 1 is counted N times, meaning that the gamma radiation from the data collecting sector 1 is read N time, wherein $$N = (D_{11} + D_{25} + D_{39}) \cdot R \qquad (3)$$

Wherein $D_{ij}$ (i=1, 2, 3; j=1, 2, . . . 12) is the number of readings of probe i in counting sector number j.

As such, the number of readings each probe receives in each of the twelve data collecting sectors can be obtained. The gamma ray readings are them used to create a gamma ray image. An example of such a gamma ray image is shown in FIG. 3, which indicates the orientation of the formation layer and its thickness.

Figure 3:
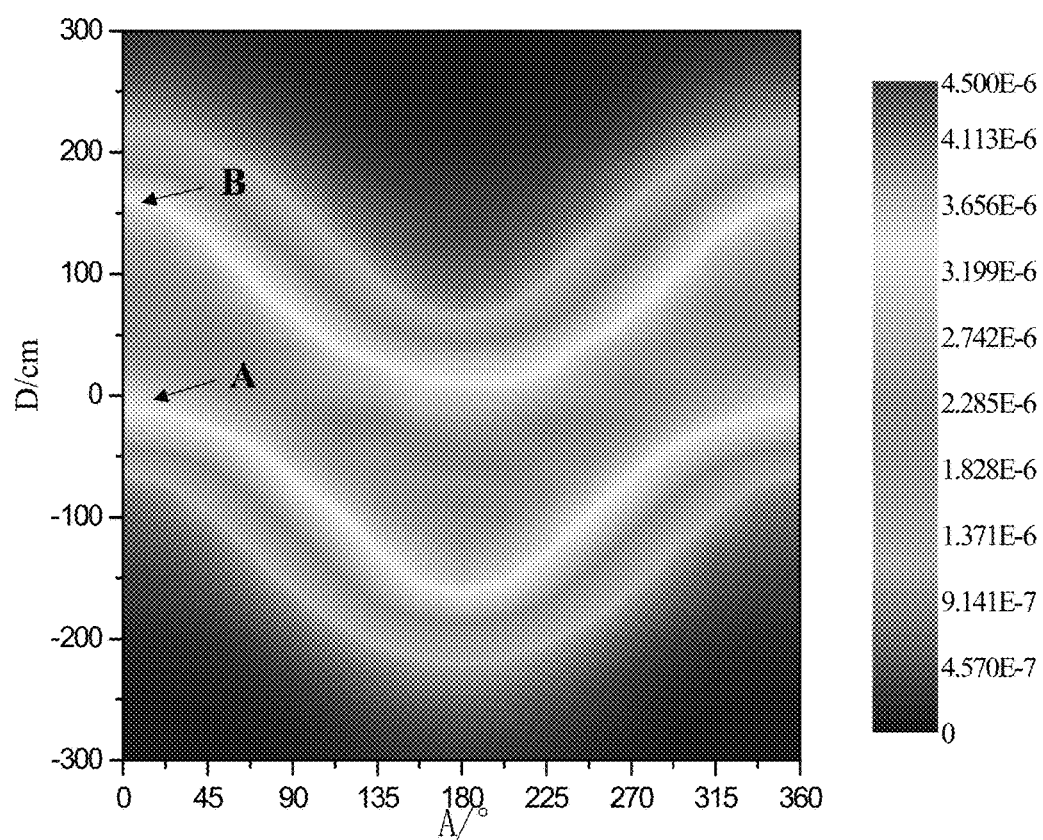
FIG. 3 is an exemplary gamma ray image.

Referring to FIG. 3, point A is the initial point where the gamma ray probe encounters the gamma ray-emitting formation layer, indicated by the abrupt change in color of the image, while B is the end point when the gamma ray probe exits the formation layer. The distance AB between point A and point B represents the thickness of the gamma ray-remitting formation layer along the wall of the wellbore. The inclination of the radioactive formation layer is $$\alpha = \arctan(AB/D + 2DOI) \quad (4)$$

Wherein D is the wellbore caliper and DOI is the depth of gamma ray penetration into the formation. According, the vertical thickness of the radioactive formation D is $$H = AB \cdot \sin(90° - \alpha) \quad (5)$$

Referring now to the near-bit resistivity tool in this disclosure, it includes at least one transmitter T and two receivers R1 and R2. T sends electromagnetic signals into the formation that induces a voltage in each of the receivers R1 and R2. In general, the induced voltage in the receiver is a linear combination of different electromagnetic coupling components, $V_{ij}(i,j=x,y,z)$. In a planar geometry formation in which all the relevant bedding boundaries are parallel, there are a maximum of six uncertain elements in the 3×3 electromagnetic coupling matrix, referred to as $V_{xx}$, $V_{yy}$, $V_{zz}$, $V_{xz}$, $V_{xy}$ and $V_{yz}$. The z-axis is along the tool axis and the y-axis is parallel to the boundary plane.

In this embodiment, each of the receivers R1 and R2 has a $V_{zz}$ electromagnetic coupling component at their particular locations. The phase shift and the signal amplitudes ratio between these two different $V_{zz}$ electromagnetic coupling component can be used to calculate formation resistivity. At the same time, at least one of the antennas R1 and R2 receives a $V_{zx}$ electromagnetic coupling component.

Figure 4:
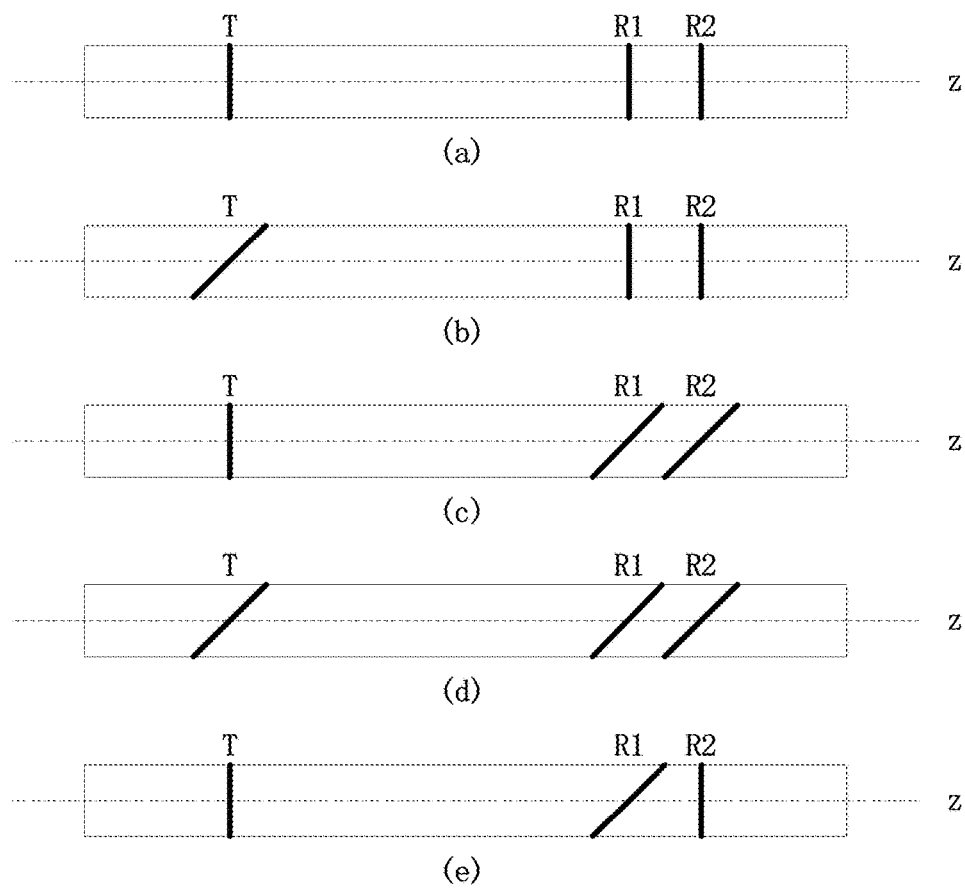
FIG. 4 shows schematics diagrams of embodiments of the near-bit resistivity tool.

FIG. 4 provides five exemplary configurations. In FIG. 4 the letter T represents the transmitter while $R_1$ and $R_2$ represent the receivers. The distance between the transmitter and any one of the receivers is less than 2 meters, preferably less than 1 meter. FIG. 4(a) shows that all the coil antennas are co-axial to the drill collar along the z-axis. In embodiments depicted in FIGS. 4(b)-(e), however, at least one among T, R1, and R2 are titled. In embodiments not shown in FIG. 4, one or more of the antennas can be transverse to the drill collar so that its magnetic moment is perpendicular to the z-axis.

In this embodiment, the near bit resistivity tool operates at three or more working frequencies (i.e., emitting and receiving electromagnetic signals at three or more frequencies). At least two of the working frequencies are in the range of 0.2 MHz to 4 MHz and are used for resistivity measurement and formation boundary identification. At least one of the working frequencies is in the range of 5 kHz-20 kHz and is used for short distance wireless data transmissions.

During operation, the near-bit resistivity tool may collect signals according to sectors, i.e., one 360° rotation is divided into certain data collecting sectors. Alternatively, the near-bit resistivity tool may collect data at certain time intervals. In the latter mode, the number of rotations the drilling tool made during the time interval shall also be recorded.

The signal induced in the receiver is a variable of the geometric relationship between the transmitter and the receiver, e.g., orientation. Such signals go through the signal decomposition process to account for the differences in orientations between the transmitter and the receiver. According to one embodiment, signals collect in different data collecting sectors or during a certain time interval are fit to a function of toolface Ø, as shown in Equation (6) below.

$$Re\{V(\phi)\} = \alpha_{RE0} + \{\alpha_{RE1} \cos(\phi) + b_{RE1} \sin(\phi)\} + \{\alpha_{RE2} \cos(2\phi) + b_{RE2} \sin(2\phi)\}$$

$$Im\{V(\phi)\} = \alpha_{IM0} + \{\alpha_{IM1} \cos(\phi) + b_{IM1} \sin(\phi)\} + \{\alpha_{IM2} \cos(2\phi) + b_{IM2} \sin(2\phi)\} \quad (6)$$

Wherein Re is the real part of the signal, Im is the imaginary part of the signal, while a and b are coefficents. Ø is the toolface while V is the voltage induced in the receiver.

Figure 5A:
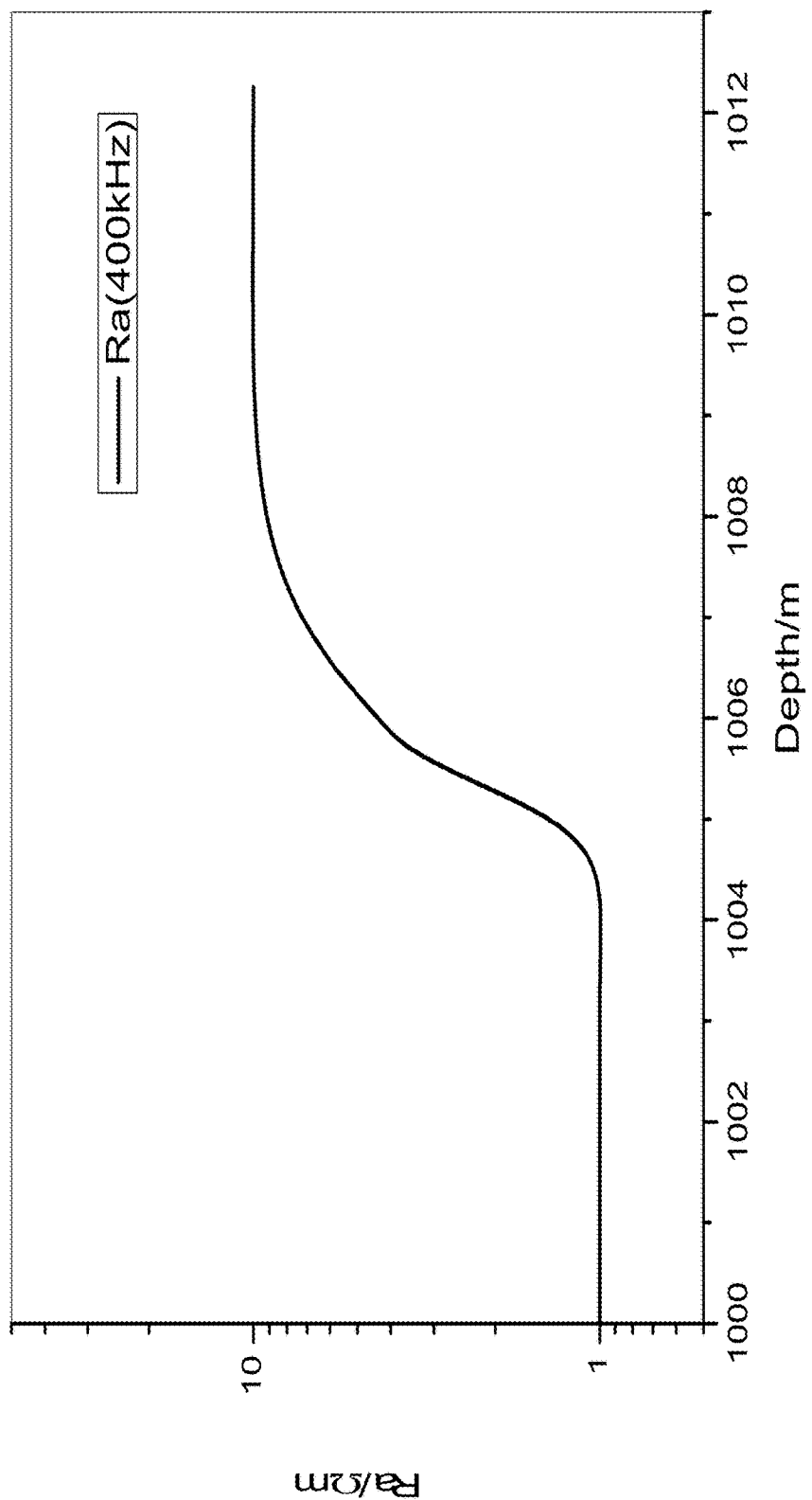
FIG. 5(a) shows simulation results of apparent resistivity over formation depth measured using the near-bit resistivity tool.
Figure 5B:
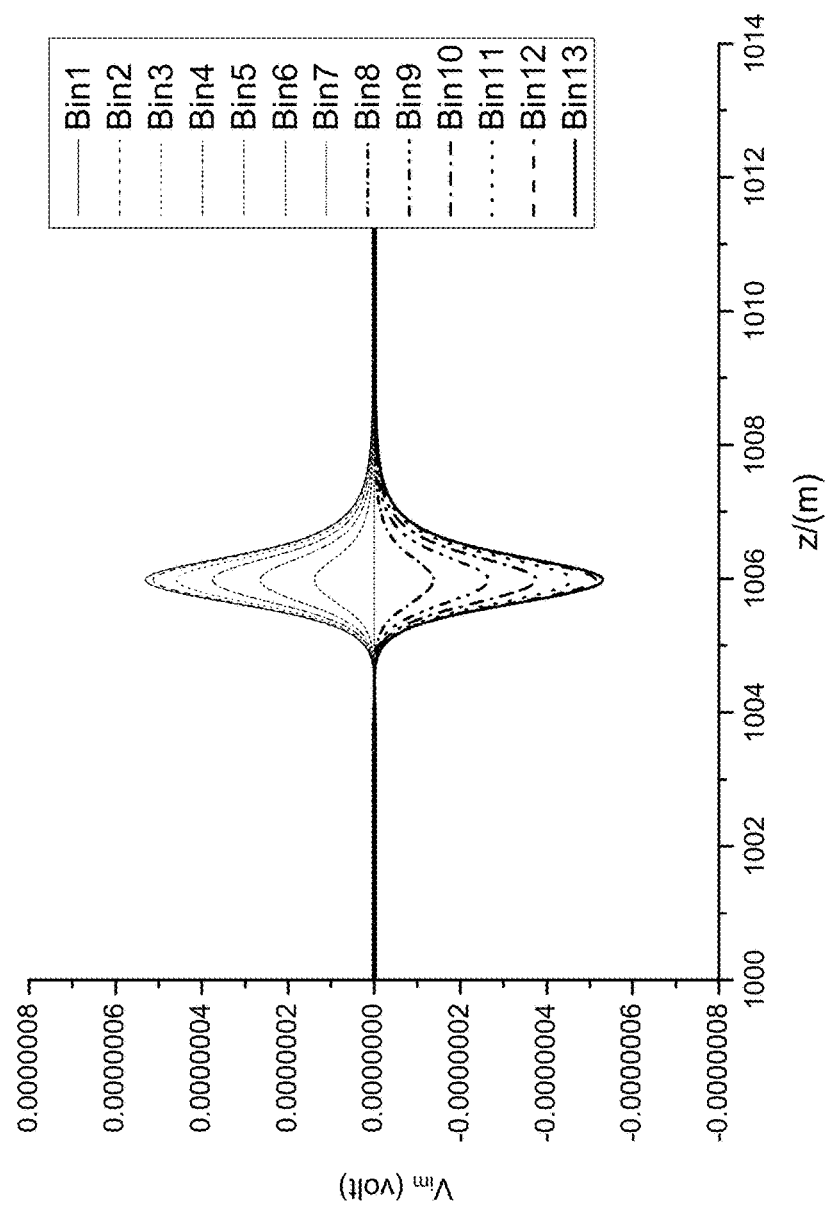
FIG. 5(b) is a calibration chart for borehole amplitude resistivity adjustment.
Figure 5C:
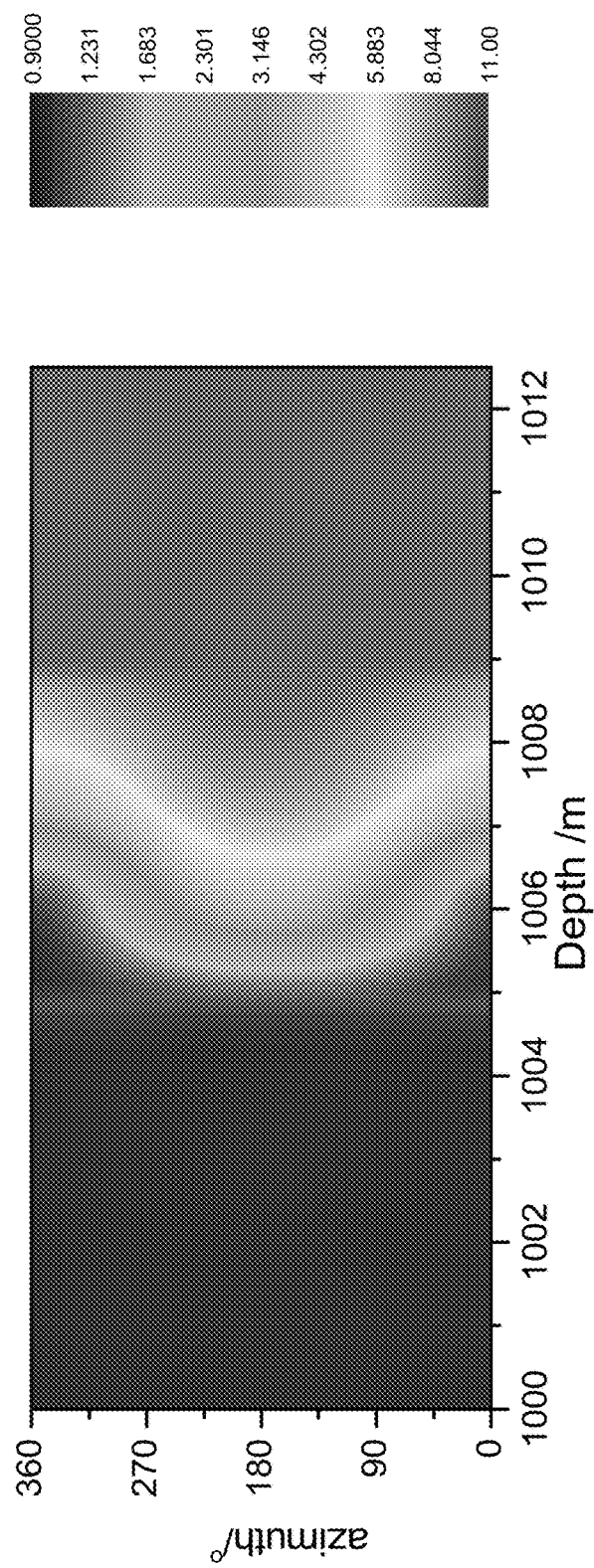
FIG. 5(c) is a calibration chart for borehole phase shift resistivity adjustment.

FIGS. 5(a)-5(c) shows simulation results assuming the formation boundary is at a depth of around 1006 m along the z-axis and the operating frequency of 400 kHz. $V_{zz}$ is used to obtain the average resistivity as shown in FIG. 5(a), showing a change in apparent resistivity $R_a$ from about 1 Ω·m to about 10 Ω·m. $V_{zx}$ is used to obtain the azimuth signal of the formation, as shown in FIG. 5(b). Bin1 to Bin 13 are responses received from their respective collecting sectors. There are a total of 24 sectors but each response from Bin13 to Bin 24 is identical to one of the responses from Bin 1 to Bin 13. $V_{zz}$ and $V_{zx}$ are combined to form the azimuth resistivity, which can further be represented in an image, as shown in FIG. 5(c).

Figure 6:
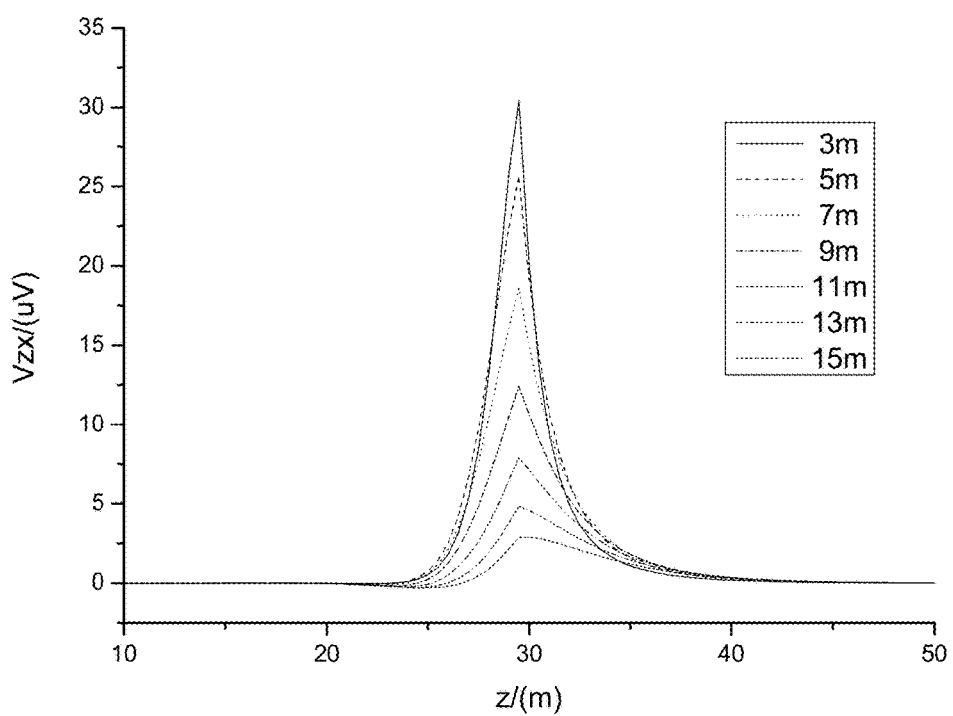
FIG. 6 shows simulation results of the deep-reading electromagnetic logging tool with different transmitter-receiver spacing; in particular $V_{zx}$ over the depth in the z-axis.

Referring now to the deep-reading electromagnetic logging tool 180, it has one axial transmitter 181, one transverse receiver 182, and two titled receivers 183 and 184. In a simulation, assuming that the formation resistivity on each side the boundary is 1 Ω·m and 20 Ω·m, respectively, and the wellbore inclination is 85°, the modeling results reveal that when using $V_{zx}$ to detect the boundary, the larger the spacing between the transmitter and the receiver is, the smaller the amplitude and the dynamic range of the signal becomes. As shown in FIG. 6, the spacing between the transmitter and the receiver increases from 3 m to 15 m, the maximum amplitude of $V_{zx}$ drops from about 30 µV to about 3 µV. The boundary is at a depth of 30 m (z=30 m).

On the other hand, it is noted that if the signal detection threshold is kept at a 100 nV, when the spacing is larger than 7 m, the detection depth does not increase significantly.

Furthermore, the phase shift and attenuation of signals in one tilted receiver from two signals that are 180° apart in azimuth can be represented using equations (7) and (8), respectively:

$$Amp = 20 \log_{10} \left| \frac{V_{(\phi)}}{V_{(\phi+180°)}} \right| \quad (7)$$

$$Pha = \arg(V_{(\phi)}) - \arg(V_{(\phi+180°)}) \quad (8)$$

Wherein V is the voltage induced in a tilted receiver, Ø is the azimuth of the receiver, and arg(V) is the argument of V. In this case, the resistivity responds differently to the spacing. The larger the spacing between the transmitter and the receiver is, the stronger the signal at the boundary, and the larger the detection depth into the formation become.

In one embodiment of the deep-reading electromagnetic logging tool, the transverse receiver 182 is disposed between the transmitter 181 and the receivers 183 and 184. The induced voltage at the transverse receiver 182 and the directional signals received by the tilted receivers 183 and 184 are used as the detection signals. The phase shift and attenuation of $V_{zz}$ in the tilted receivers are used to obtain deep formation resistivity.

Figure 7:
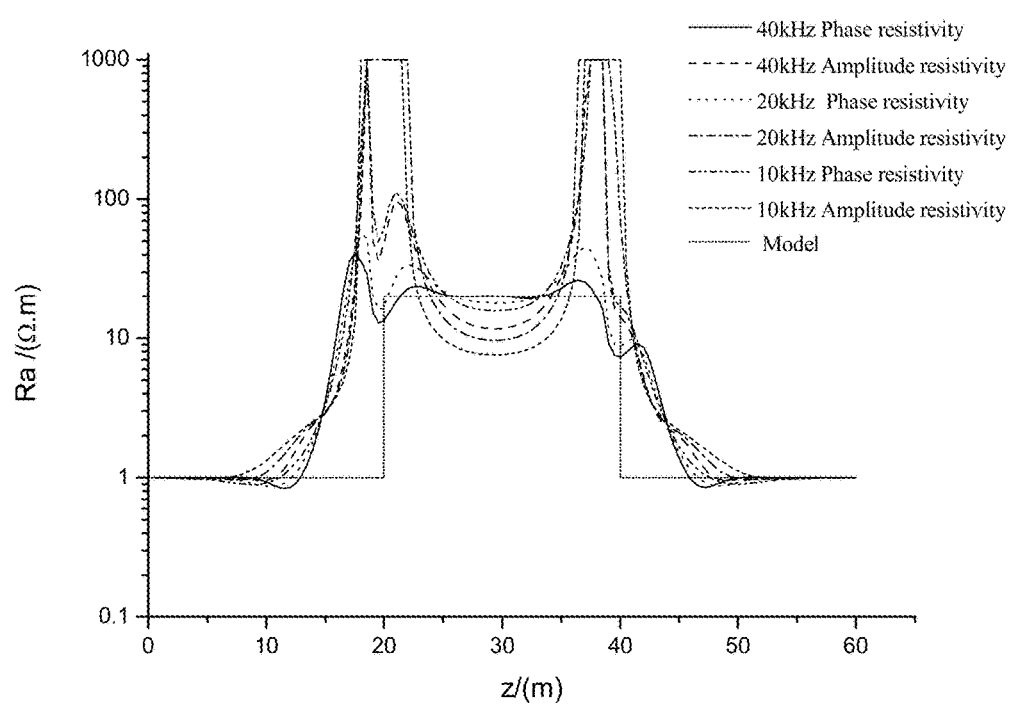
FIG. 7 shows simulation results of the deep-reading electromagnetic logging tool at different operating frequencies; in particular the apparent resistivity ($R_a$) over depth in the z-axis.

FIG. 7 shows results of a further simulation. In this case, the formation has a middle layer (z=20-40 m, resistivity of 20 Ω·m) with one layer (z<20 m or z>40 m, resistivity of 1 Ω·m) on each side of the middle layer. The distances between each of the tilted receivers and the transmitter are 12 m and 17 m, respectively. The simulation results indicate that when operating at a lower frequency, the instrument is more sensitive to changes in formation resistivity, i.e., showing a stronger response at the boundary of two formation layers. On the other hand, the ability to accurately predict the resistivity in the target formation layer (i.e., the middle layer, resistivity of 20 Ω·m) deteriorates at lower operating frequencies.

Figure 8:
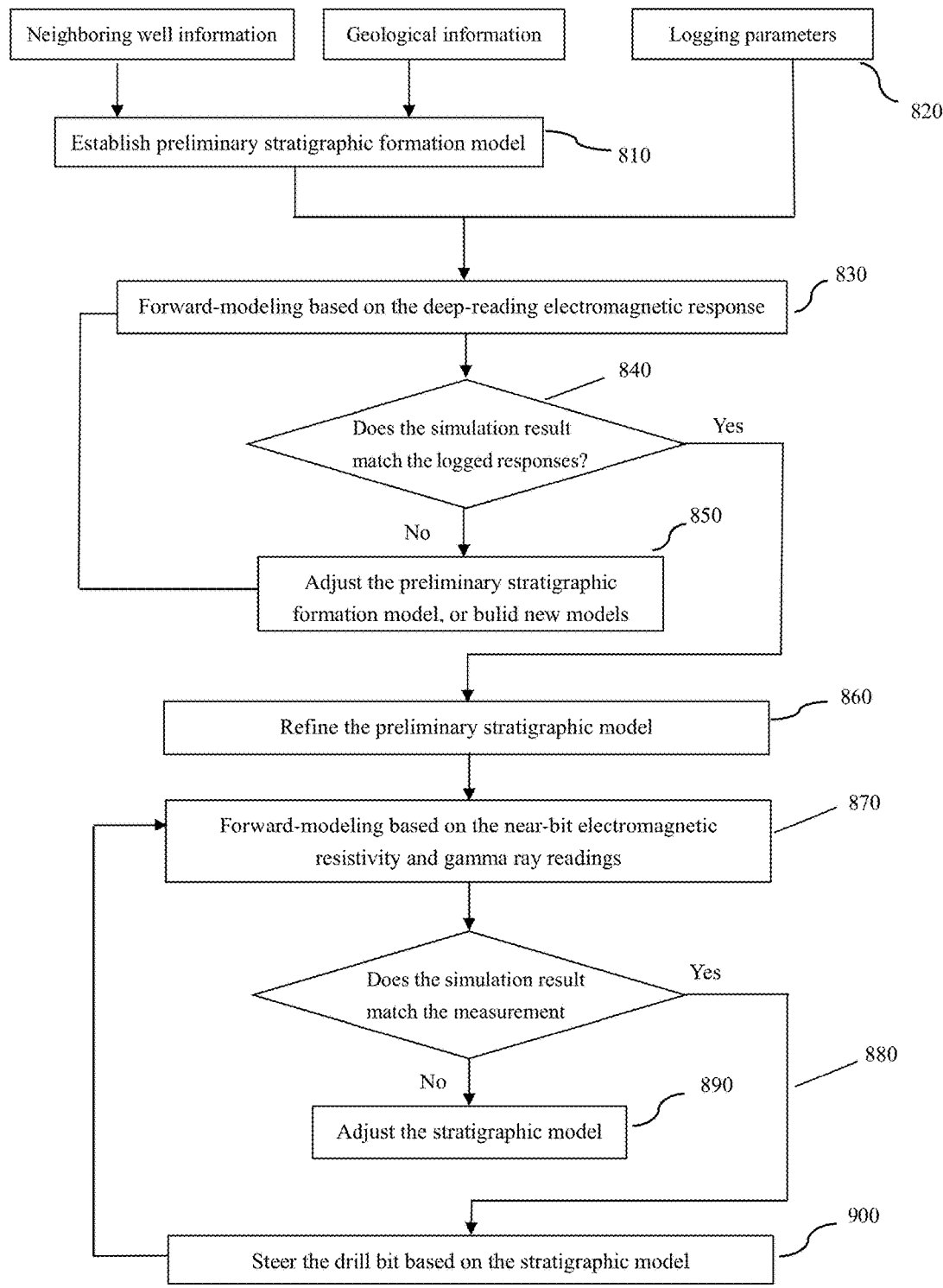
FIG. 8 shows a process of building and refining a stratigraphic model.

FIG. 8 illustrates a process of using a drilling system of the current disclosure to perform geosteering for optimized well placement and trajectory control. First, a preliminary stratigraphic model and the associated resistivity model are built based on data obtained from neighboring wells and other available geological data (block 810).

Parameters of measurement instruments (block 820), e.g., antenna spacing, operating frequency of the deep-reading electromagnetic logging tool and the near-bit electromagnetic resistivity tool, are incorporated into the preliminary models. The model is applied to the deep-reading electromagnetic logging tool to obtain a response (block 830). The simulation response is compared with the measured logs gathered by measurements at the well site (block 840). If the simulation does not match the measurement results, the preliminary models are adjusted or rebuilt (block 850). The reiterative forward modeling continues until the simulation matches the measured logs.

The preliminary model, after being reiteratively adjusted using the response from the deep-reading electromagnetic logging tool, is further modified to build a refined model (block 860). The refined model is used as a starting point to further perform reiterative forward modeling. In particular, the refined models are used obtain responses from the near-bit electromagnetic resistivity tool and from the gamma-ray detector (block 870). The simulation with measured logs of the formation resistivity and gamma-ray readings from the well site are compared (block 880). The model is adjusted accordingly (block 890). Such a reiterative forward modeling is carried out until the simulation matches measurement logs.

The deep-reading electromagnetic logging tool operates at numerous operating frequencies. The optimal frequency is selected to maximize the measurement depth and resolution. As a result, greater depth of the formation can be evaluated ahead of the advancing drill bit. This real-time formation information is fed back into the reiterative forward modeling process to enable real-time adjustment of the stratigraphic model to guide geosteering.

While preferred embodiments of this disclosure have been shown and described, modifications can be made by one skilled in the art without departing from the spirit or teaching of this invention. The embodiments described herein are exemplary only and are not limiting. Many variations and modifications of the system and apparatus are possible and are within the scope of the invention. For example, instruments as well as the method illustrated in FIG. 8, are applicable to a rotary steerable system (RSS) without a downhole motor. Accordingly, the scope of protection is not limited to the embodiments described herein, but is only limited by the claims. The scope of the claims shall include all equivalents of the subject matter of the claims.

What is claimed is:

1. A method to determine a property of a formation traversed by a drilling tool, comprising:
   providing a drilling tool that comprises a drill bit, a drill motor, an inclination measurement tool, a near-bit resistivity tool, and a deep-reading electromagnetic logging tool, wherein a distance between near-bit resistivity tool and the drill bit is smaller than a distance between the deep-reading electromagnetic logging tool and the drill bit;
   adjusting a stratigraphic model for the property of the formation by iterative forward modeling using measured responses from the deep-reading electromagnetic logging tool to obtain an adjusted stratigraphic model; and
   refining the adjusted stratigraphic model by iterative for forward modeling using measure responses from the near-bit resistivity tool and the gamma-ray detector to obtain a refined stratigraphic model,
   wherein the deep-reading electromagnetic logging tool is installed above the drill motor, and comprises an axial transmitter, a transverse receiver, two tilted receivers sequentially arranged in a upward direction, and
   wherein a distance between the axial transmitter and one of the two tilted receivers is larger than 10 meters.

2. The method of claim 1, wherein the deep-reading electromagnetic logging tool further comprises a transverse receiver disposed between the axial transmitter and the two tilted receivers.

3. The method of claim 2, wherein the deep-reading electromagnetic logging tool comprises a first tool body and a second tool body, wherein the first tool body comprises one drill collar or an assembly of drill collars coaxially coupled together, wherein the two titled receivers are not coaxial with the second tool body.

4. The method of claim 3, comprising operating the deep-reading electromagnetic logging tool at a frequency in the range of 1 kHz and 200 kHz.

5. The method of claim 1, wherein the near-bit resistivity tool comprises a second tool body, and at least one transmitter and at least two receivers disposed on the first tool body, wherein a distance between the at least one transmitter and any of the at least two receivers is less than 1 meter.

6. The method of claim 5, wherein the second tool body is a drill collar, wherein at least one of the transmitter and the receivers is not coaxial with the first tool body.

7. The method of claim 6, wherein a gamma ray detector is disposed on the second tool body.

8. The method of claim 1, comprising operating the near-bit resistivity tool at a frequency in the range of 0.2 MHz to 4 MHz.

9. The method of claim 1, comprising steering the drilling tool based on the refined stratigraphic model.

* * * * *